(12) United States Patent
Tanaka

(10) Patent No.: US 11,815,489 B2
(45) Date of Patent: Nov. 14, 2023

(54) MEASUREMENT DEVICE AND MEASUREMENT METHOD

(71) Applicant: KYOCERA Corporation, Kyoto (JP)

(72) Inventor: Hiroyasu Tanaka, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 276 days.

(21) Appl. No.: 17/289,191

(22) PCT Filed: Oct. 30, 2019

(86) PCT No.: PCT/JP2019/042699
§ 371 (c)(1),
(2) Date: Apr. 27, 2021

(87) PCT Pub. No.: WO2020/090944
PCT Pub. Date: May 7, 2020

(65) Prior Publication Data
US 2021/0341425 A1    Nov. 4, 2021

(30) Foreign Application Priority Data

Oct. 30, 2018  (JP) .................................. 2018-203661

(51) Int. Cl.
*G01N 29/02* (2006.01)
*G01N 29/22* (2006.01)
*G01N 29/24* (2006.01)

(52) U.S. Cl.
CPC ......... *G01N 29/022* (2013.01); *G01N 29/222* (2013.01); *G01N 29/24* (2013.01);
(Continued)

(58) Field of Classification Search
CPC ......... G01N 29/022; G01N 2291/0423; G01N 29/222; G01N 29/24; G01N 2291/101;
(Continued)

(56) References Cited

U.S. PATENT DOCUMENTS

| 7,566,531 B2* | 7/2009 | Marx ................... G01N 33/574 436/806 |
| 2016/0187358 A1 | 6/2016 | Tanaka et al. |
| 2020/0173967 A1* | 6/2020 | Abe ........................ G01N 19/00 |

FOREIGN PATENT DOCUMENTS

| CA | 2311398 A1 * | 6/1999 | ........... G01N 29/036 |
| JP | 2005-083949 A | 3/2005 | |

(Continued)

*Primary Examiner* — Lisa M Caputo
*Assistant Examiner* — Rose M Miller
(74) *Attorney, Agent, or Firm* — Procopio, Cory, Hargreaves & Savitch LLP

(57) ABSTRACT

A measurement device includes a sensor that detects a particular substance, a storage unit that stores calibration data that indicate a relationship between a measurement value of the particular substance and an output of the sensor, and a calculation unit that calculates the measurement value of the particular substance from the calibration data based on the output of the sensor. The calculation unit produces a first waveform where a plurality of first outputs of the sensor are normalized, produces a plurality of second waveforms where a plurality of second outputs of the sensor that are included in the calibration data are normalized. The calculation unit calculates a measurement value of the particular substance based on the first waveform and the plurality of second waveforms.

18 Claims, 6 Drawing Sheets

(52) U.S. Cl.
CPC ... *G01N 2291/01* (2013.01); *G01N 2291/022* (2013.01); *G01N 2291/0255* (2013.01); *G01N 2291/0256* (2013.01); *G01N 2291/0423* (2013.01); *G01N 2291/105* (2013.01)

(58) Field of Classification Search
CPC ..... G01N 2291/022; G01N 2291/0255; G01N 2291/0256; G01N 2291/105
USPC .......................................................... 73/649
See application file for complete search history.

(56) References Cited

FOREIGN PATENT DOCUMENTS

| | | | | |
|---|---|---|---|---|
| JP | 2006-275606 A | 10/2006 | | |
| JP | 2008-286606 A | 11/2008 | | |
| JP | 2010-107335 A | 5/2010 | | |
| JP | 2016-145815 A | 8/2016 | | |
| WO | WO-0054044 A1 * | 9/2000 | ........... | G01N 29/022 |
| WO | 2014/192196 A1 | 12/2014 | | |

* cited by examiner

MEASUREMENT DEVICE AND MEASUREMENT METHOD

CROSS-REFERENCE TO RELATED APPLICATION(S)

This application is a national stage application of International Application No. PCT/JP2019/042699 filed on Oct. 30, 2019, which designates the United States, the entire contents of which are herein incorporated by reference, and which is based upon and claims the benefit of priority to Japanese Patent Application No. 2018-203661 filed on Oct. 30, 2018, the entire contents of which are herein incorporated by reference.

FIELD

The present invention relates to a measurement device and a measurement method.

BACKGROUND

A surface acoustic wave sensor device has been known conventionally (Patent Literature 1).

CITATION LIST

Patent Literature

Patent Literature 1: Japanese Patent Application Publication No. 2008-286606

SUMMARY

Technical Problem

For such a sensor, improvement of a degree of accuracy of measurement thereof is desired.

Solution to Problem

A measurement device according to an embodiment of the present invention includes a sensor that detects a particular substance, a storage unit that stores calibration data that indicate a relationship between a measurement value of the particular substance and an output of the sensor, and a calculation unit that calculates the measurement value of the particular substance from the calibration data based on the output of the sensor. The calculation unit produces a first waveform where a plurality of first outputs of the sensor are normalized, and produces a plurality of second waveforms where a plurality of second outputs of the sensor that are included in the calibration data are normalized. Then, the calculation unit calculates a measurement value of the particular substance based on the first waveform and the plurality of second waveforms.

A measurement method according to an embodiment of the present invention includes detecting a particular substance by a sensor, producing a first waveform where a plurality of first outputs of the sensor are normalized, normalizing a plurality of second outputs of the sensor for respective measurement values that are included in calibration data to produce a plurality of second waveforms, wherein the calibration data indicate a relationship between measurement values of the particular substance and a plurality of outputs of the sensor, and calculating a measurement value of the particular substance based on the first waveform and the plurality of second waveforms.

Advantageous Effects of Invention

It is possible for a measurement device and a measurement method according to the present invention to improve a degree of accuracy of measurement thereof.

DESCRIPTION OF EMBODIMENTS (Measurement Device)

EMBODIMENT

Hereinafter, a measurement device 1 according to an embodiment of the present invention will be explained by appropriately using the drawings.

Figure 1:
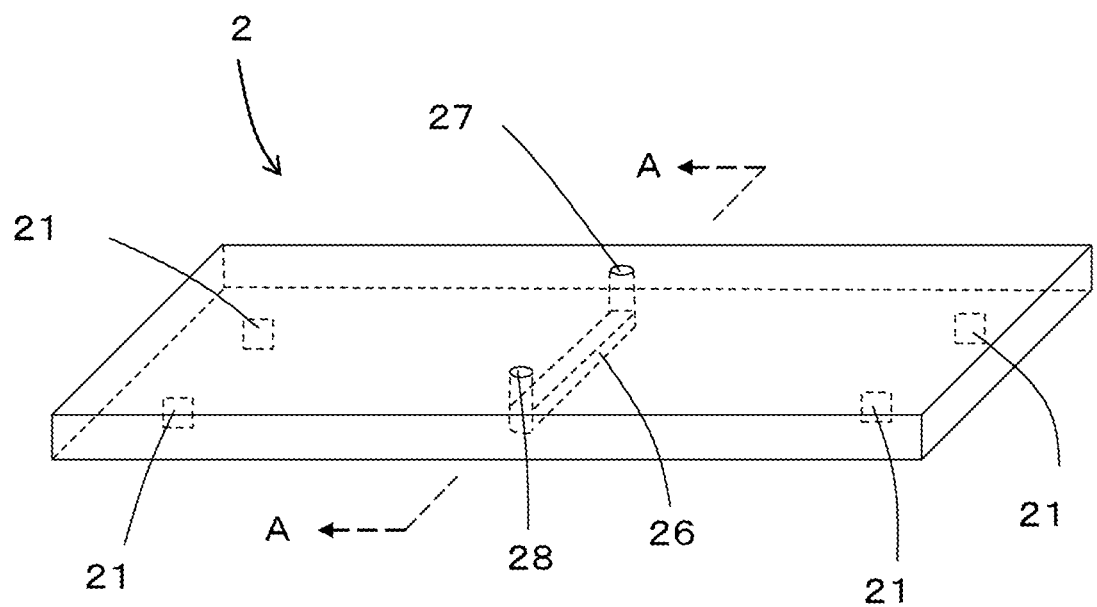
FIG. 1 is a schematic diagram that schematically illustrates a measurement device according to an embodiment.
Figure 1:
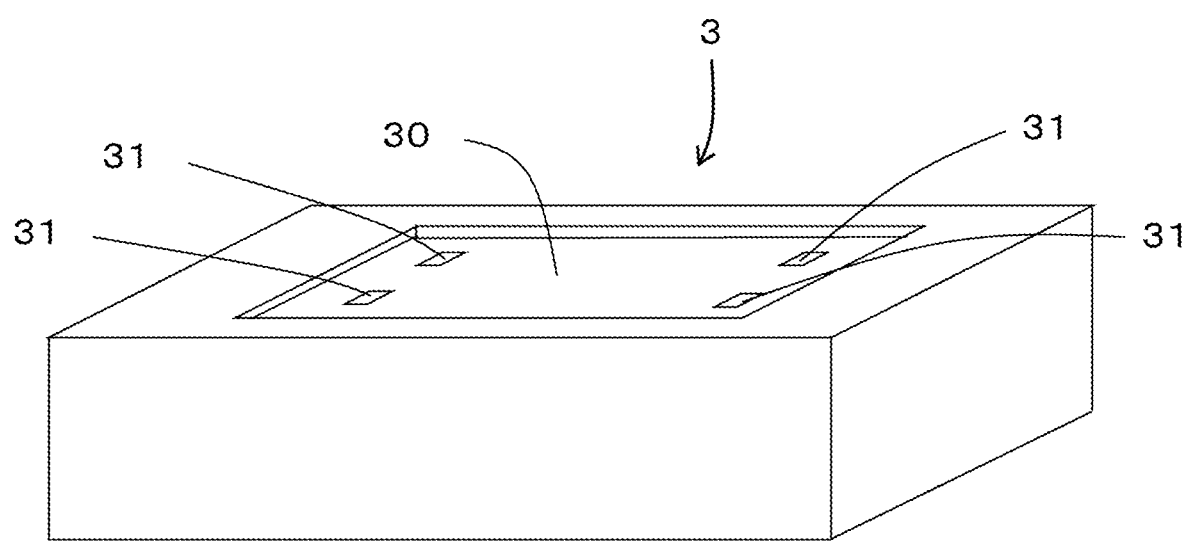

FIG. 1 is a schematic diagram of a measurement device 1 according to an embodiment. It is possible for the measurement device 1 to detect a first substance that is a particular substance as a target from a specimen that is a measurement object. The measurement device 1 includes a sensor 2 that is capable of detecting the first substance and a control device 3 that controls the sensor 2. The sensor 2 is electrically connected to the control device 3.

In the measurement device 1 in the present disclosure, the sensor 2 has an external terminal(s) 21, and the control device 3 has a recess 30 where a connection terminal(s) 31 is/are provided on a bottom surface thereof. Then, the sensor 2 is disposed in the recess 30 of the control device 3 in such a manner that the connection terminal(s) 31 is/are connected to the external terminal(s) 21.

Figure 2:
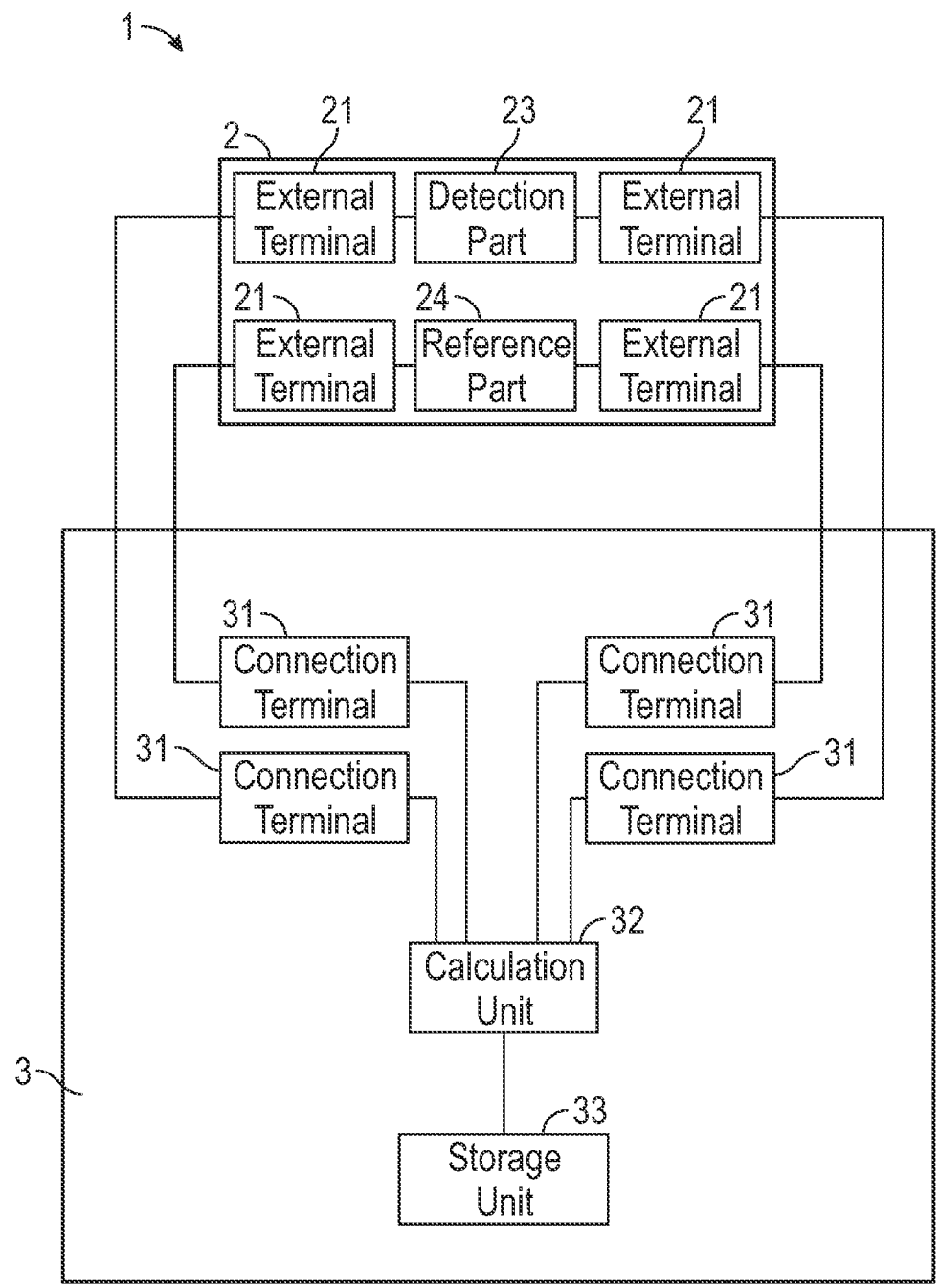
FIG. 2 is a block diagram that illustrates an outline of the measurement device.

FIG. 2 is a block diagram that illustrates each functional part of the measurement device 1. As described above, it is possible for the sensor 2 to detect the first substance. For example, it is possible for the sensor 2 to output a signal that is changed due to detection of the first substance to the control device 3. Additionally, a signal that is output by the sensor 2 indicates, for example, information of a variable such as a phase, a frequency, a voltage value, a current value, or a weight value. That is, in the measurement device 1, an output of the sensor 2 is handled as, for example, information of a numerical value such as a phase, a frequency, a voltage value, a current value, or a weight value. Additionally, information of a numerical value may include not only a simple magnitude of a variable but also, for example, a magnitude of a variable per unit time. That is, information of a numerical value may also include a temporal change of a variable. Additionally, in the present disclosure, information of a numerical value that is an output of the sensor 2 may simply be represented as an output of the sensor 2.

The sensor 2 in the present disclosure is a surface acoustic wave sensor that executes detection of the first substance based on a phase variation of a surface acoustic wave. In such a case, an output of the sensor 2 indicates an amount of change of a phase difference of a surface acoustic wave. Herein, a phase difference is a difference between a phase of a transmitted surface acoustic wave and a phase of a received surface acoustic wave, and an amount of change of a phase difference is a value that indicates how much a phase difference is changed by detection of the first substance.

It is possible for the sensor 2 to output a signal that is dependent on detection of the first substance. It is sufficient that the sensor 2 utilizes, for example, a surface acoustic wave, QCM (Quartz Crystal Microbalance), SPR (Surface Plasmon Resonance), an FET (Field Effect Transistor), and the like.

Figure 3:
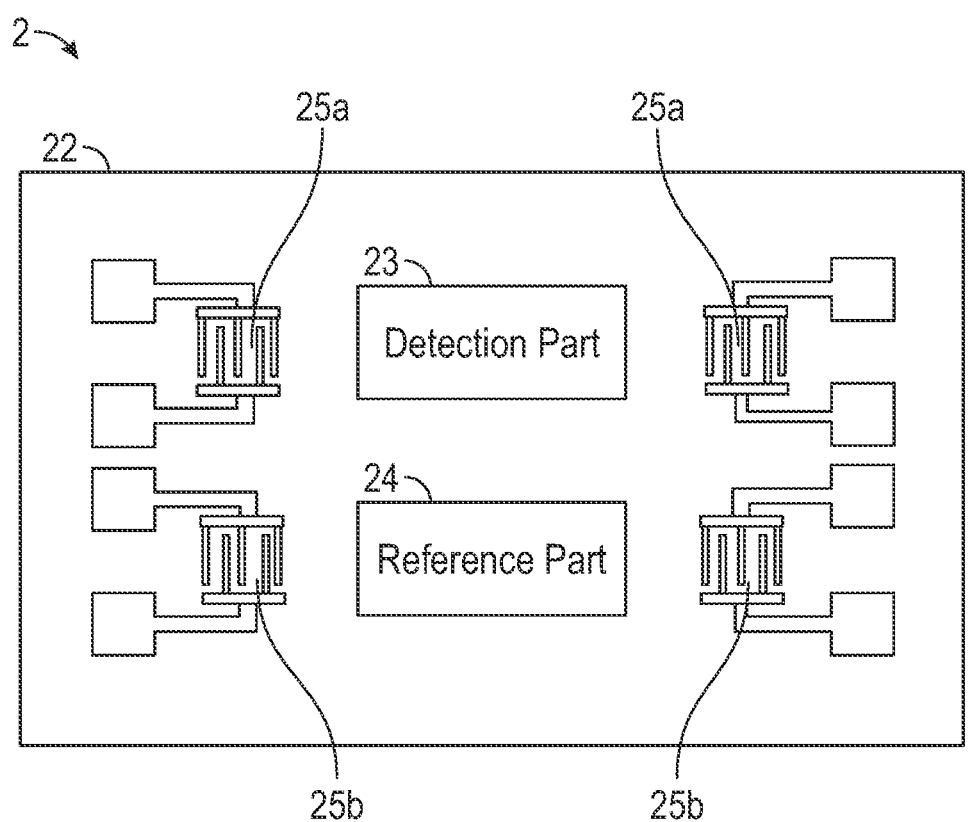
FIG. 3 is a plan view of a part of the measurement device.

FIG. 3 is a plan view of the sensor 2. The sensor 2 includes a substrate 22, a detection part 23 that is positioned on the substrate 22, and a pair of first IDT (Inter Digital Transducer) electrodes 25a that are deposited so as to interpose the detection part 23 therebetween on the substrate 22. It is possible for the substrate 22 to support the first IDT electrodes 25a or the like. It is possible for the detection part 23 to detect the first substance. It is possible for the pair of first IDT electrodes 25a to generate a surface acoustic wave between the pair of first IDT electrodes 25a. Additionally, it is possible to fabricate the sensor 2 by a conventionally well-known method.

The substrate 22 is a piezoelectric substrate. For example, it is sufficient that the substrate 22 is a substrate that includes a single crystal that has piezoelectricity such as lithium tantalate or quartz.

It is possible for a part of a surface of the substrate 22 to function as the detection part 23. In other words, the detection part 23 is a region that composes a part of a surface of the substrate 22. A second substance that is a substance that reacts with the first substance is fixed on the detection part 23 that is a region that composes a part of a surface of the substrate 22. The first substance and the second substance react in the detection part 23, so that it is possible for the sensor 2 to detect the first substance. Then, a signal that is caused by detection of the first substance is output from the sensor 2 to the control device 3.

It is sufficient that a reaction between the first substance and the second substance is a reaction that causes a change in an output of the sensor 2. Such a reaction may be, for example, an oxidation-reduction reaction, an enzyme reaction, an antigen-antibody reaction, a chemisorption, an intermolecular interaction, or a reaction to bond the first substance and the second substance by an interionic interaction or the like, or a reaction to produce a third substance that is a substance that is newly produced by an enzyme reaction or the like.

It is sufficient that the second substance that is fixed on the detection part 23 is appropriately selected depending on the first substance. For example, in a case where the first substance is a particular protein, DNA, cell, or the like in the specimen, an antibody, a peptide, an aptamer, or the like may be used for the second substance. Furthermore, for example, in a case where the first substance is an antibody, an antigen may be used for the second substance. Furthermore, for example, in a case where the first substance is a substrate, an enzyme may be used for the second substance.

It is possible for the pair of first IDT electrodes 25a to transmit a surface acoustic wave that propagates from one thereof toward the detection part 23 and receive a surface acoustic wave that passes through the detection part 23 on another thereof. It is sufficient that the pair of first IDT electrodes 25a are formed of, for example, a metallic material such as gold, chromium, or titanium. Furthermore, the pair of first IDT electrodes 25a may be that of single-layer electrodes that are composed of a single material or that of multi-layer electrodes that are composed of a plurality of materials.

The sensor 2 has a configuration as described above, so that it is possible to detect the first substance. For example, the first substance and the second substance react in the detection part 23, so that a viscosity or a density of a surface of the detection part 23 is changed and a phase of a surface acoustic wave that passes through the detection part 23 is changed. Therefore, it is possible for the sensor 2 to detect the first substance.

Furthermore, as a reaction between the first substance and the second substance is enhanced and a change of a viscosity or a density is increased, an amount of phase variation is increased. In other words, an amount of phase variation of a surface acoustic wave depends on the first substance and the second substance. Hence, it is possible not only to detect the first substance but also to measure a content, a concentration, or the like of the first substance.

It is possible for another part of a surface of the substrate 22 to further function as a reference part 24. In other words, the reference part 24 is a region that composes a part of a surface of the substrate 22 and is different from the detection part 23. Furthermore, the sensor 2 further has a pair of second IDT electrodes 25b that are positioned so as to interpose the reference part 24 therebetween on the substrate 22. It is possible for the pair of second IDT electrodes 25b to transmit a surface acoustic wave that propagates from one thereof toward the reference part 24 and receive a surface acoustic wave that passes through the reference part 24 on another thereof.

The second substance is not fixed on the reference part 24 that is a region that composes a part of a surface of the substrate 22 unlike the detection part 23. That is, a reaction between the first substance and the second substance as described above does not occur on the reference part 24. Hence, the sensor 2 takes a difference between a signal that is acquired by the detection part 23 and a signal that is acquired by the reference part 24, so that it is possible to acquire a change of a signal that is caused by a reaction between the first substance and the second substance.

Figure 4:
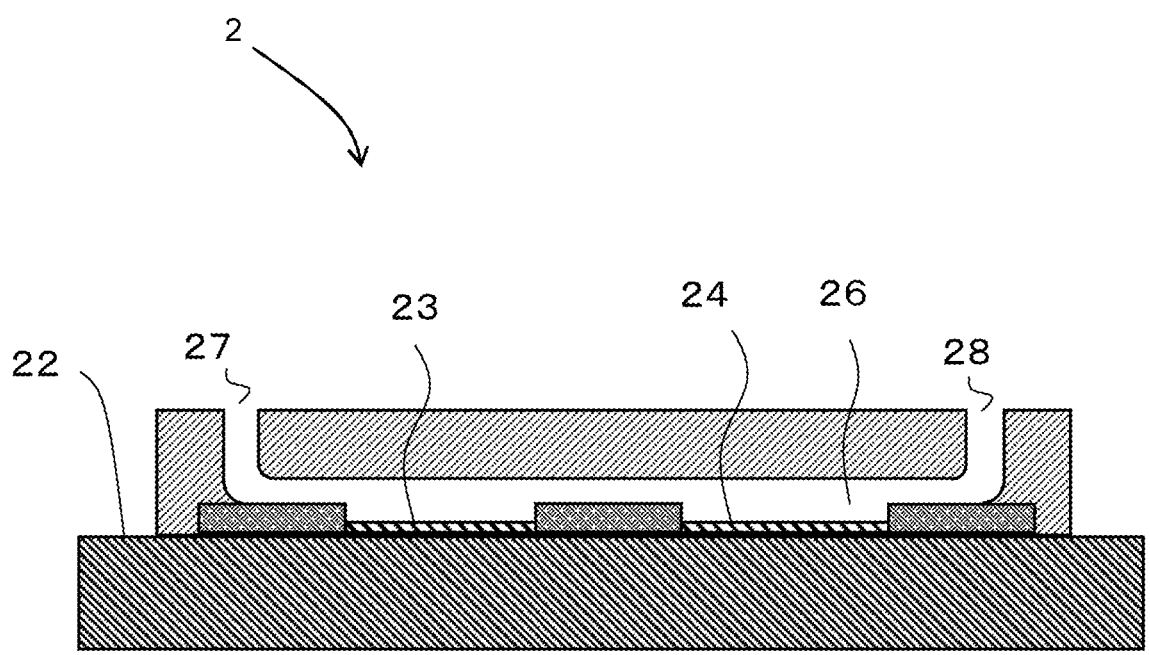
FIG. 4 is a cross-sectional view of a part of the measurement device as illustrated in FIG. 1 along a cutting plane line A-A.

FIG. 4 is a cross-sectional view of the sensor 2 along a cutting plane line A-A in FIG. 1. The sensor 2 further has a flow path member 26. It is possible for the flow path member 26 to function as a path for the specimen. The flow path member 26 is opened on an upper surface of the flow path member 26 and has a supply port 27 to supply the specimen and a discharge port 28 to discharge the specimen. When the specimen that is supplied from the supply port 27 reaches the detection part 23, the sensor 2 detects the first substance in the detection part 23 and subsequently discharges the specimen from the discharge port 28.

It is possible for the control device 3 to execute control of the measurement device 1. The control device 3 has a calculation unit 32 and a storage unit 33. It is possible for the calculation unit 32 to receive a signal from the sensor 2 as needed during measurement and acquire a temporal change of an output as a measurement result. Herein, in the present disclosure, a set of information of a numerical value that is obtained as a measurement result is referred to as a waveform. Then, acquiring a waveform or producing a waveform refers to simply acquiring a set of information of a numerical value or further mathematically converting acquired information of a numerical value to acquire a new set of information of a numerical value. Then, it is possible for the calculation unit 32 to calculate a measurement value of the first substance based on an acquired waveform. It is possible for the storage unit 33 to store a program or the like for an operation of the calculation unit 32.

The control device 3 has a plurality of semiconductor elements. As a result, it is possible for the control device 3 to compose each functional unit of the control device 3. That is, for the control device 3, it is possible to integrate the plurality of semiconductor elements so as to form at least one IC (Integrated Circuit), LSI (Large Scale Integration), or the like. Alternatively, for the control device 3, it is possible to further integrate a plurality of ICs, LSIs, or the like so as to form at least one unit. Therefore, for the control device 3, it is possible to compose each functional unit that is possessed by the control device 3. For the control device 3 in the present disclosure, the plurality of semiconductor elements are integrated so as to compose the calculation unit 32, the storage unit 33, or the like.

It is sufficient that the plurality of semiconductor elements are, for example, active elements such as transistors or diodes or passive elements such as capacitors. Additionally, it is possible to form the plurality of semiconductor elements, an integrated circuit that is formed by integrating them, and the like, by a conventionally well-known method.

Specifically, the calculation unit 32 has, for example, a processor. The processor may include, for example, one or more processors, a controller, a microprocessor, a microcontroller, an application specific integrated circuit (ASIC: Application Specific Integrated Circuit), a digital signal processing device, a programmable logic device, or a combination of such devices or any calibrations, or a combination of other known devices or calibrations.

Specifically, the storage unit 33 has, for example, a RAM (Random Access Memory) or a ROM (Read-Only Memory). Firmware is stored in the storage unit 33. As a result, it is possible for the processor of the calculation unit 32 to execute one or more data calculation procedures or process according to the firmware in the storage unit 33.

Furthermore, it is possible for the storage unit 33 in the present disclosure to store calibration data. Calibration data refers to a relationship between an output of the sensor 2 that is obtained by measuring a standard substance and a measurement value where the standard substance is the first substance that has a known measurement value at a time when it is measured by using the sensor 2. Additionally, it is possible for the storage unit 33 to store a plurality of calibration data. A plurality of calibration data may be data that are acquired for each of different measurement values of identical substances or may be data that are acquired for each of different substances with identical measurement values. Additionally, an output of the sensor 2 that is used for detection of the first substance is provided as a first output below. Then, an output of the sensor 2 that is used for detection of the standard substance is provided as a second output. Herein, it is sufficient that the sensor 2 that is used for detection of the first substance and the sensor 2 that is used for detection of the standard substance are the sensors 2 that are composed of a similar kind of components and/or members structurally. That is, a sensor that is used for detection of the standard substance does not have to be directly used for detection of the first substance.

Herein, a measurement value may be, for example, a concentration or a mass of the first substance or a reaction rate, an equilibrium constant, a coupling constant, or a specificity constant for the first substance and the second substance. Furthermore, the calculation unit 32 may execute identification of the first substance based on a calculated measurement value.

The calculation unit 32 in the present disclosure calculates a concentration of the first substance as a measurement value. Hereinafter, a process procedure or a measurement method for the calculation unit 32 to calculate a concentration of the first substance will be explained.

Figure 5A:
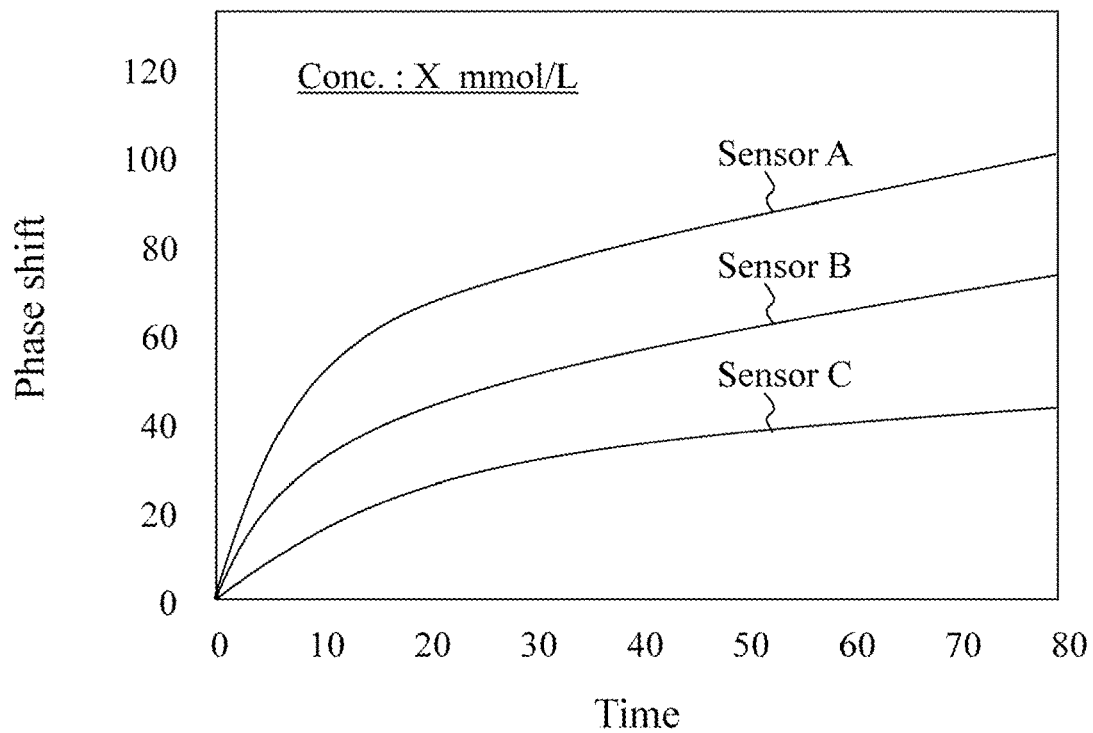
FIG. 5A is a diagram where measurement results of measurement devices are plotted.
Figure 5B:
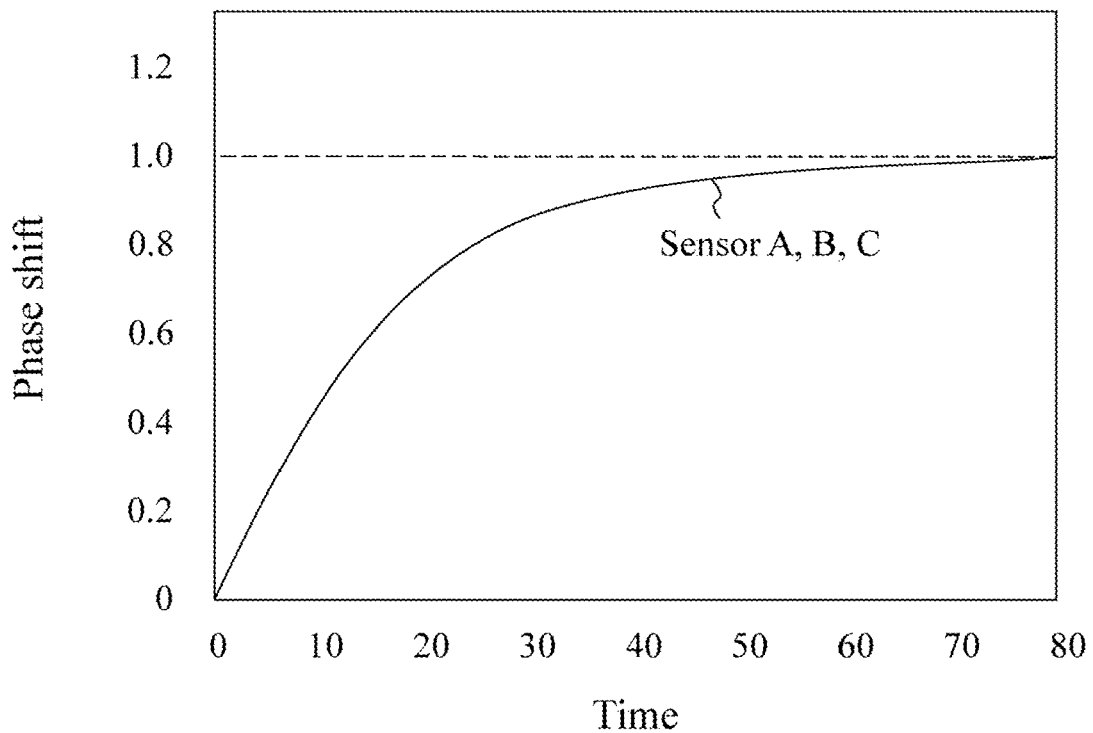
FIG. 5B is a diagram where numerical values that are provided by mathematically processing measurement results of the measurement devices are plotted.

FIG. 5A is a diagram where measurement results that are obtained in a case where standard substances with identical concentrations are respectively measured by a plurality of sensors (sensor A, sensor B, and sensor C) are plotted while a time is provided on a horizontal axis and a phase difference is provided as a vertical axis. That is, a measurement time is indicated on the horizontal axis and an output of a sensor is indicated on the vertical axis. FIG. 5B is a diagram where a plurality of measurement results as illustrated in FIG. 5A are normalized and plotted.

Conventionally, detection sensitivities are different among respective sensors, so that, even if the first substance with identical concentrations is measured, respectively different results are obtained. For example, as illustrated in FIG. 5A, waveforms that are acquired by respective sensors may be different, so that a degree of accuracy of measurement of a measurement device is reduced.

On the other hand, the measurement device 1 according to the present invention includes the sensor 2 that detects a first substance that is a particular substance, the storage unit 33 that stores calibration data that indicate a relationship between a measurement value of the first substance and an output of the sensor, and the calculation unit 32 that calculates a measurement value of the first substance from the calibration data based on an output of the sensor 2. Then, the calculation unit 32 produces a first waveform that is a waveform where a plurality of first outputs of the sensor 2 are normalized. Furthermore, the calculation unit 32 produces a plurality of second waveforms for respective measurement values that are included in the calibration data. The second waveforms are waveforms where a plurality of second outputs of the sensor 2 are normalized. Herein, measurement values that are included in the calibration data may be acquired, for example, for a plurality of respective standard substances with different concentrations. Then, the calculation unit 32 calculates a measurement value of the first substance based on the first waveform and the second waveforms.

As a result, in the measurement device 1 according to the present invention, it is possible to reduce an influence of a variation of a sensitivity of each sensor 2, so that it is possible to improve a degree of accuracy of measurement.

Hereinafter, measurement by the measurement device 1 will be explained in detail while a case where a concentration of the first substance is calculated as being executed by the measurement device 1 is provided as an example.

Figure 6:
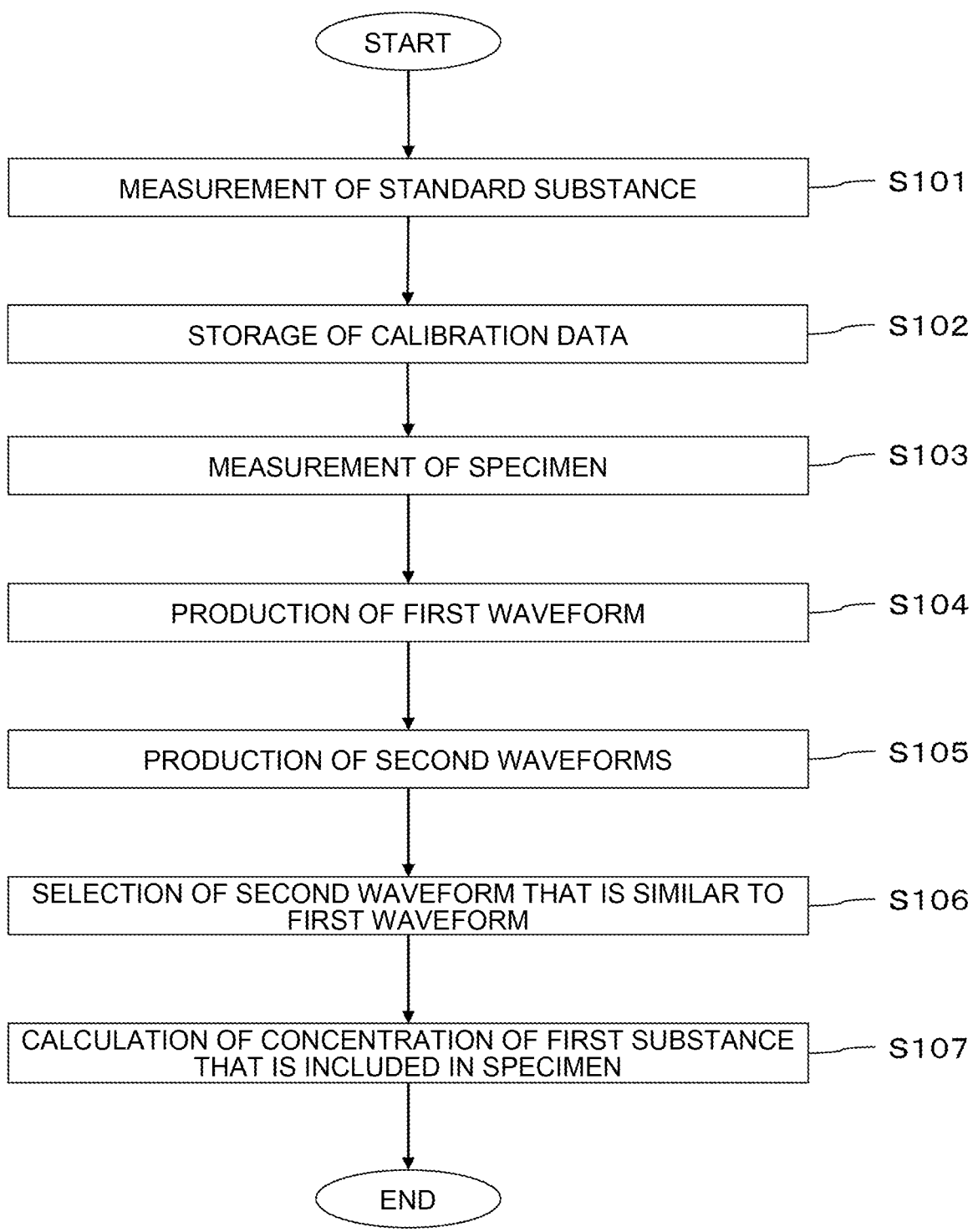
FIG. 6 is a flow diagram that illustrates an example of a process of the measurement device.

FIG. 6 illustrates a process procedure of the measurement device 1. Additionally, a process as illustrated in FIG. 6 may be started immediately after the specimen is supplied to the sensor 2 or may be started after the specimen is supplied and after any amount of time passes.

First, the calculation unit 32 executes measurement of the standard substance (step S101). At step S101, measurement may be executed for the standard substance with a plurality of concentrations. The storage unit 33 stores a relationship between second outputs and a plurality of concentrations of the standard substance with the plurality of concentrations, as calibration data (step S102). The second outputs are outputs are acquired at step S101.

Then, the calculation unit 32 executes measurement of the specimen (step S103). The calculation unit 32 normalizes a plurality of first outputs that are acquired at step S103 so as to produce a first waveform (step S104). Furthermore, the calculation unit 32 normalizes second outputs so as to produce a plurality of second waveforms (step S105).

Then, the calculation unit 32 compares the first waveform and the plurality of second waveforms so as to select a second waveform that is similar to the first waveform, among the plurality of second waveforms (step S106). The calculation unit 32 calculates a concentration of the first substance that corresponds to a selected second waveform as a measurement value (step S107).

Additionally, in a case where the calibration data are created at step S102, the calibration data may be created by using a normalized output of the sensor 2. In such a case, it is possible for the measurement device 1 to omit step S105 and execute a process flow as described above, so that it is possible to reduce a measurement time.

An amount of reaction of the second substance that reacts with the first substance with a concentration is constant, so that it is possible to reduce an output difference between respective sensors 2 that is obtained in a case where identical concentrations are measured, by normalizing outputs of the sensors 2 as described above. Therefore, it is possible for the measurement device 1 to reduce a sensitivity difference between the respective sensors 2, so that it is possible to improve a degree of accuracy of measurement.

In an embodiment, normalization of an output of the sensor 2 is executed by dividing a whole output among acquired outputs of the sensor 2 by a predetermined value. A predetermined value may be, for example, if acquired outputs of the sensor 2 are amounts of change of a phase difference, a maximum value or a median value of such amounts of change. Additionally, a method of normalization is not limited thereto, where it is sufficient that an operation that is capable of reducing an influence that is based on a sensitivity difference between detection parts 23 is provided.

Herein, determination of similarity between the first waveform and the second waveform by the calculation unit 32 will be explained. The calculation unit 32 may determine similarity between the first waveform and the second waveform by, for example, an error or a variation of an error that is calculated based on the first waveform and the second waveform. A variation may be, for example, a standard deviation or a standard error.

It is sufficient that a range of an error or a range of a variation of an error where the calculation unit 32 determines that the first waveform and the second waveform are similar is determined so as to be any range depending on a measurement object, a measurement purpose, or the like. For example, it is sufficient that, if a difference between a maximum output of the first waveform and a maximum output of the second waveform is within 1% relative to the maximum output of the second waveform, it is determined that the first waveform and the second waveform are similar.

Therefore, in such a case, the calculation unit 32 selects a second waveform in such a manner that such an output difference relative to an acquired first waveform is 1%, so that it is possible to calculate a concentration of the standard substance that corresponds to such a second waveform as a concentration of the first substance.

Furthermore, in a case where a second waveform where such an output difference is within 1% is not present, the calculation unit 32 may, for example, select, among stored second waveforms, a second waveform where such an output difference is minimum and a second waveform where it is second minimum, and calculate concentrations of the standard substance that correspond to such two second waveforms. Then, the calculation unit 32 may calculate a range between two calculated concentrations as a range of a concentration of the first substance.

Furthermore, the calculation unit 32 may select a second waveform where an error or a variation of an error is minimum and calculate a concentration of the first substance, without setting an acceptable range of an error.

The calculation unit 32 may determine whether or not the first waveform and the second waveform are similar, based on slopes of tangent lines for the first waveform and the second waveform within a predetermined measurement time. Specifically, the calculation unit 32 may calculate a difference or a quotient between a slope of a tangent line for the first waveform and a slope of a tangent line for the plurality of second waveforms within a predetermined measurement time, select a second waveform where such a difference or quotient falls within a predetermined error range, and output a measurement value of the second waveform as a measurement value of the substance. For example, the calculation unit 32 may calculate an error based on a difference or a quotient between slopes of tangent lines for the first waveform and the second waveform 30 seconds after a start of measurement, and determine that the first waveform and the second waveform are similar, in a case where such an error falls within an acceptable range. Additionally, it is sufficient that an error range is arbitrarily determined depending on a needed degree of accuracy of detection. For example, an error range may be plus or minus 1%. That is, for example, the calculation unit 32 may determine that the first waveform and the second waveform are similar, in a case where a calculated difference or quotient is included within plus or minus 1% of a slope of a tangent line for the second waveform.

The calculation unit 32 may calculate a difference or a quotient between respective values that compose the first waveform and the second waveform at a predetermined measurement time and determine similarity therebetween. Specifically, the calculation unit 32 may calculate a difference or a quotient between a value that composes the first waveform and a value that composes the second waveform at a predetermined measurement time, select a second waveform where such a difference or quotient falls within a predetermined error range, and calculate a measurement value of the second waveform as a measurement value of the substance. For example, the calculation unit 32 may calculate a difference or a quotient between respective values of the first waveform and the second waveform 30 seconds after a start of a measurement, and determine that the first waveform and the second waveform are similar, in a case where such a difference or quotient falls within a predetermined error range. Additionally, it is sufficient that an error range is arbitrarily determined depending on a needed degree of accuracy of detection. For example, an error range may be plus or minus 1%. That is, for example, the calculation unit 32 may determine that the first waveform and the second waveform are similar, in a case where a calculated difference or quotient is included within plus or minus 1% of a value of the second waveform.

Additionally, a value that composes the first waveform refers to information of one of aggregated numerical values that compose the waveform. A value that composes the first waveform is represented by, for example, Phase Shift that is indicated on the vertical axis in FIG. 5B. A value that composes the second waveform may also be interpreted, similarly to a value that composes the first waveform.

The calculation unit 32 may determine similarity based on a variation of an error that is calculated from slopes of a plurality of respective tangent lines of the first waveform and the second waveform that are calculated at a plurality of measurement times. Specifically, for example, the calculation unit 32 may calculate a difference or quotient between slopes of respective tangent lines of the first waveform and the second waveform 30 seconds after, 60 seconds after, and 90 seconds after a start of measurement, and determine that the first waveform and the second waveform are similar, in a case where they fall within a predetermined variation of an error (error range). Additionally, it is sufficient that an error range is arbitrarily determined depending on a needed degree of accuracy of detection. For example, an error range may be plus or minus 1%. That is, for example, the calculation unit 32 may determine that the first waveform and the second waveform are similar, in a case where a calculated difference or quotient is included within plus or minus 1% of a sum of values that compose the second waveform.

The calculation unit 32 may determine similarity based on a variation of an error that is calculated from a plurality of values that compose the first waveform and the second waveform and are calculated at a plurality of measurement times. For example, the calculation unit 32 may calculate a difference or quotient between respective values of the first waveform and the second waveform 30 seconds after, 60 seconds after, and 90 seconds after a start of a measurement, and determine similarity in such a manner that the first waveform and the second waveform are similar, in a case where they fall within a predetermined variation of an error (error range). Additionally, it is sufficient that an error range is arbitrarily determined depending on a needed degree of accuracy of detection. For example, an error range may be plus or minus 1%. That is, for example, the calculation unit 32 may determine that the first waveform and the second waveform are similar, in a case where a calculated difference or quotient is included within plus or minus 1% of a sum of values that compose the second waveform.

The calculation unit 32 may calculate a difference or a quotient between surface areas of the first waveform and the second waveform in any range of a measurement time and determine similarity therebetween. Herein, a surface area refers to a sum of values that compose a waveform within a time range. Therefore, the calculation unit 32 may calculate a difference or a quotient between a sum of a plurality of values that compose the first waveform and a sum of a plurality of values that compose the second waveform within a predetermined measurement time, select a second waveform where such a difference or quotient falls within a predetermined error range, and calculate a measurement value of the second waveform as a measurement value of the substance. For example, for the first waveform and the second waveform, the calculation unit 32 may calculate surface areas of the respective waveforms in a range of 10 seconds after to 20 seconds after a start of a measurement, and a range of 40 seconds after to 50 seconds after, calculate a difference or a quotient between such surface areas, and determine similarity in such a manner that the first waveform and the second waveform are similar, in a case where such an error falls within an acceptable range. Additionally, it is sufficient that an error range is arbitrarily determined depending on a needed degree of accuracy of detection. For example, an error range may be plus or minus 1%. That is, for example, the calculation unit 32 may determine that the first waveform and the second waveform are similar, in a case where a calculated difference or quotient is included within plus or minus 1% of a sum of values that compose the second waveform.

The calculation unit 32 may calculate a surface area ratio of surface areas of the first waveform and the second waveform in a range of two any measurement times and determine similarity based on a surface area ratio of the first waveform and a surface area ratio of the second waveform. For example, the calculation unit 32 calculates a first surface area that is a surface area in a range of 10 seconds after to 20 seconds after a start of a measurement and a second surface area that is a surface area in a range of 40 seconds after to 50 seconds after, for each of the first waveform and the second waveform. The calculation unit 32 may calculate a difference or a quotient between a ratio of the first surface area and the second surface area of the first waveform and a ratio of the first surface area and the second surface area of the second waveform, and determine similarity in such a manner that the first waveform and the second waveform are similar, in a case where such a difference or quotient falls within a predetermined error range. Additionally, it is sufficient that an error range is arbitrarily determined depending on a needed degree of accuracy of detection. For example, an error range may be plus or minus 1%. That is, for example, the calculation unit 32 may determine that the first waveform and the second waveform are similar, in a case where a calculated difference or quotient is included within plus or minus 1% of a surface area ratio of the second waveform.

Some embodiments have been explained in the above description(s) in order to disclose the present disclosure clearly. However, the appended claim(s) should not be limited to the embodiment(s) as described above but should be configured so as to implement all of variations and substitutable configurations that are capable of being created by a person(s) skilled in the art in such a technical field within a range of basic items as illustrated in the present specification. Furthermore, it is possible to combine respective requirements as illustrated in some embodiments freely. For example, a measurement device, a measurement method, or a program may be configured by appropriately combining respective components or steps of the embodiments as described above.

For example, although a case where a single detection part 23 is provided has been explained as an example in the embodiment(s) as described above, the present invention is not limited to such a case. For example, the sensor may have two or more detection parts. Accordingly, it is possible to execute measurement of a plurality of kinds of target substances.

Furthermore, the sensor 2 may be a disposable cartridge. Accordingly, a step of cleaning the sensor 2 after measurement is not needed, so that it is possible to exclude an influence of insufficient cleaning on a measurement result.

Furthermore, although an example where the calibration data are acquired based on a measured output of the standard substance has been illustrated in the embodiment(s) as described above, the present invention is not limited to such a case as long as data are capable of calculating a concentration of the first substance. For example, in a case where a relationship between an output of the sensor 2 and a concentration of the first substance is clear theoretically or statistically, the calibration data may be data that are based on a theoretical value or a statistical value and data of an actual measurement value do not have to be used.

Furthermore, although the storage unit 33 stores a relationship between a waveform that is obtained by measuring the standard substance and a concentration of the standard substance as the calibration data in the embodiment(s) as described above, the present invention is not limited to such a case. For example, the calculation unit 32 may estimate and create a waveform that corresponds to a concentration that is not measured from a waveform that corresponds to a concentration that is measured. In such a case, it is possible for the storage unit 33 to store calibration data where a waveform that corresponds to a concentration that is not measured is interpolated.

For example, a case where standard substances with a concentration X and a concentration Z are measured and a waveform that corresponds to a concentration Y between the concentrations X-Z is interpolated will be explained by using Formula 1 and Formula 2 as illustrated below. Additionally, in such a case, the concentration X is a concentration that is less than the concentration Z.

First, the calculation unit 32 creates a calibration curve from the concentrations X, Z that are measured and maximum outputs of waveforms that respectively correspond thereto, and calculates a maximum output (y) of a waveform that corresponds to the concentration Y that is interpolated. Additionally, when a calibration curve is created, it may be created based on a plurality of concentrations. Then, the calculation unit 32 calculates an output U by adding a maximum output difference (z-y) between a waveform that corresponds to the concentration Z and a waveform that corresponds to the concentration Y that is multiplied by a whole output S of a waveform for the concentration X and a maximum output difference (y-x) between the waveform that corresponds to the concentration Y and a waveform that corresponds to the concentration X that is multiplied by a whole output T of a waveform for the concentration Z in Formula 1. The calculation unit 32 calculates an output V by dividing a calculated output U by a maximum output difference (z-x) between a waveform that corresponds to the concentration X and a waveform that corresponds to the concentration Z in Formula 2. The calculation unit 32 creates a waveform that corresponds to the concentration Y by representing the output V that is obtained by Formula 2 as a temporal change. The storage unit 33 stores a waveform that is thus created, so that it is possible to store calibration data where a waveform that corresponds to the concentration Y between the concentrations X-Z is interpolated.

Formula 1 is defined as follows:

$$S \times (z-y) + T \times (y-x) = U.$$

Formula 2 is defined as follows:

$$U \div (z-x) = V.$$

Furthermore, although it is possible to execute creation of the calibration data and measurement of the specimen in identical flows in the embodiment(s) as described above, the present invention is not limited to such a case. For example, it is sufficient that the calibration data are stored in the storage unit 33 before measurement of the specimen is started. Therefore, creation and storage of the calibration data do not have to be executed in a flow that is identical to that of measurement of the specimen and it is possible for the calculation unit 32 to execute calculation of a concentration of the first substance by using the calibration data that are preliminarily stored in the storage unit 33.

Additionally, in such a case, it is possible for the measurement device 1 to start a process flow as illustrated in FIG. 6 from step S103, so that it is possible to reduce a measurement time, and further, even in a case where an unstable specimen is measured, it is possible to reduce an influence of degradation of the specimen on a measurement result. Furthermore, the measurement device 1 does not have to interpose a step of cleaning the sensor 2 or the like between a step of measuring the standard substance and a step of measuring the specimen, so that it is possible to execute measurement of the specimen more conveniently.

Furthermore, although an example where the detection part 23 is a part of a surface of the substrate 22 has been explained in the embodiment(s) as described above, the present invention is not limited to such a case. For example, a metal film such as Ti—Au or Cr—Au, an organic polymer, or the like may be provided on, for example, a part of a surface of the substrate 22 so as to provide the detection part 23. Additionally, in such a case, the second substance may be fixed on a surface of a metal film or the like.

(Measurement Method)

Additionally, each step that is executed in the measurement device 1 as described above may be interpreted as an invention of a measurement method.

Specifically, a measurement method according to an embodiment of the present invention includes a step of preparing a sensor that is capable of detecting a particular substance, a step of preparing calibration data that indicate a relationship between a measurement value of the substance and a first output of the sensor, a step of detecting the substance by the sensor, a step of producing a first waveform where a plurality of first outputs of the sensor are normalized, a step of normalizing a plurality of second outputs of the sensor for respective measurement values that are included in the calibration data so as to produce a plurality of second waveforms, and a step of calculating a measurement value of the substance based on the first waveform and the second waveforms. As a result, it is possible for such a measurement method to improve a degree of accuracy of measurement.

Furthermore, in the measurement method as described above, the first waveform may be produced by dividing a value of an output by a predetermined value.

Furthermore, in the measurement method as described above, a predetermined value may be a maximum value of the first waveform.

Furthermore, in the measurement method as described above, a predetermined value may be a median value of the first waveform.

Furthermore, at a step of calculating a measurement value of the substance in the measurement method as described above, a measurement value of the substance may be calculated based on slopes of respective tangential lines for the first waveform and the second waveform at a predetermined measurement time. Specifically, a step of calculating a measurement value of the substance may be to calculate a difference or a quotient between a slope of a tangential line for the first waveform and a slope of a tangential line for the plurality of second waveforms at a predetermined measurement time, select a second waveform where such a difference or quotient falls within a predetermined error range, and output a measurement value of the second waveform as a measurement value of the substance.

Furthermore, at a step of calculating a measurement value of the substance in the measurement method as described above, a measurement value of the substance may be calculated based on respective values of the first waveform and the second waveform at a predetermined measurement time. Specifically, a step of calculating a measurement value of the substance may be to calculate a difference or a quotient between a value that composes the first waveform and a value that composes the second waveform at a predetermined measurement time, select a second waveform where such a difference or quotient falls within a predetermined error range, and calculate a measurement value of the second waveform as a measurement value of the substance.

Furthermore, at a step of calculating a measurement value of the substance in the measurement method as described above, a measurement value of the substance may be calculated based on a sum of a plurality of values that compose the first waveform and a sum of a plurality of values that compose the second waveform at a plurality of predetermined measurement times. Specifically, a step of calculating a measurement value of the substance may be to calculate a difference or a quotient between a sum of a plurality of values that compose the first waveform and a sum of a plurality of values that compose the second waveform at a plurality of predetermined measurement times, select a second waveform where such a difference or quotient falls within a predetermined error range, and calculate a measurement value of the second waveform as a measurement value of the substance.

Furthermore, each step that is executed in the measurement device 1 as described above may be interpreted as an invention of a control method for a program that executes each step in an electronic instrument.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST 1 measurement device
2 sensor
21 external terminal
22 substrate
23 detection part
24 reference part
25a first IDT electrode
25b second IDT electrode
26 flow path member
27 supply port
28 discharge port
3 control device
30 recess
31 connection terminal
32 calculation unit
33 storage unit

The invention claimed is:

1. A measurement device, comprising:
a sensor that detects a particular substance;
a storage unit that stores calibration data that indicate a relationship between a measurement value of the particular substance and an output of the sensor; and
a calculation unit that calculates the measurement value of the particular substance from the calibration data based on the output of the sensor, wherein
the calculation unit produces a first waveform where a plurality of first outputs of the sensor are normalized, produces a plurality of second waveforms where a plurality of second outputs of the sensor for respective measurement values that are included in the calibration data are normalized, and calculates a measurement value of the particular substance based on the first waveform and the plurality of second waveforms, wherein
the calculation unit calculates the measurement value of the particular substance based on a slope of a tangent line for the first waveform and a slope of a tangent line for the plurality of second waveforms within a predetermined measurement time.

2. The measurement device according to claim 1, wherein the calculation unit calculates a difference or quotient between a slope of a tangent line for the first waveform and a slope of a tangent line for the plurality of second waveforms within a predetermined measurement time, selects a second waveform of the plurality of second waveforms where the difference or quotient falls within a predetermined error range, and outputs the measurement value of the second waveform as the measurement value of the particular sub stance.

3. The measurement device according to claim 1, wherein the calculation unit calculates the measurement value of the particular substance based on a difference or quotient between a value that composes the first waveform and a value that composes a second waveform of the plurality of second waveforms at a predetermined measurement time.

4. The measurement device according to claim 3, wherein the calculation unit calculates a difference or quotient between the value that composes the first waveform and the value that composes the second waveform at the predetermined measurement time, selects the second waveform where the difference or quotient falls within a predetermined error range, and calculates the measurement value of the second waveform as the measurement value of the particular substance.

5. The measurement device according to claim 1, wherein the calculation unit calculates the measurement value of the particular substance based on a sum of a plurality of values that compose the first waveform and a sum of a plurality of values that compose a second waveform of the plurality of second waveforms within a predetermined measurement time.

6. The measurement device according to claim 5, wherein the calculation unit calculates a difference or quotient between the sum of a plurality of values that compose the first waveform and the sum of a plurality of values that compose the second waveform of the plurality of second waveforms within the predetermined measurement time, selects the second waveform where the difference or quotient falls within a predetermined error range, and calculates the measurement value of the second waveform as the measurement value of the particular substance.

7. The measurement device according to any one of claim 1, wherein
the first waveform is produced by dividing a value of the plurality of first outputs of the sensor by a predetermined value.

8. The measurement device according to claim 7, wherein the predetermined value is a maximum value of the plurality of first outputs.

9. The measurement device according to claim 7, wherein the predetermined value is a median value of the plurality of first outputs.

10. A measurement method, comprising:

detecting a particular substance by a sensor;

producing a first waveform where a plurality of first outputs of the sensor are normalized;

normalizing a plurality of second outputs of the sensor for respective measurement values that are included in calibration data to produce a plurality of second waveforms, wherein the calibration data indicate a relationship between measurement values of the particular substance and a plurality of outputs of the sensor; and calculating a measurement value of the particular substance based on the first waveform and the plurality of second waveforms, wherein the calculating the measurement value of the particular substance includes calculating the measurement value of the particular substance is based on slopes of respective tangent lines for the first waveform and the plurality of second waveforms at a predetermined measurement time.

11. The measurement method according to claim 10, wherein the calculating the measurement value of the particular substance includes calculating a difference or quotient between a slope of a tangent line for the first waveform and a slope of a tangent line for the plurality of second waveforms at a predetermined measurement time, selecting a second waveform of the plurality of second waveforms where the difference or quotient falls within a predetermined error range is selected, and outputting a measurement value of the second waveform as the measurement value of the particular substance.

12. The measurement method according to claim 10, wherein the calculating the measurement value of the particular substance includes calculating the measurement value of the particular substance is calculated based on respective values of the first waveform and the plurality of second waveforms at a predetermined measurement time.

13. The measurement method according to claim 12, wherein the calculating the measurement value of the particular substance includes calculating a difference or quotient between a value that composes the first waveform and a value that composes the plurality of second waveforms at the predetermined measurement time is calculated, selecting a second waveform of the plurality of second waveforms where the difference or quotient falls within a predetermined error range, and calculating a measurement value of the second waveform as the measurement value of the particular substance.

14. The measurement method according to claim 10, wherein the calculating the measurement value of the particular substance includes calculating the measurement value of the particular substance based on a sum of a plurality of values that compose the first waveform and a sum of a plurality of values that compose the plurality of second waveforms at a plurality of predetermined measurement times.

15. The measurement method according to claim 14, wherein the calculating the measurement value of the particular substance includes calculating a difference or quotient between the sum of a plurality of values that compose the first waveform and the sum of a plurality of values that compose the plurality of second waveforms at the plurality of predetermined measurement times, selecting a second waveform of the plurality of second waveforms where the difference or quotient falls within a predetermined error range, and calculating a measurement value of the second waveform as the measurement value of the particular substance.

16. The measurement method according to claim 10, wherein the first waveform is produced by dividing a value of the plurality of first outputs by a predetermined value.

17. The measurement method according to claim 16, wherein the predetermined value is a maximum value of the first waveform.

18. The measurement method according to claim 16, wherein the predetermined value is a median value of the first waveform.

* * * * *